(12) United States Patent
Poertner et al.

(10) Patent No.: US 8,366,202 B2
(45) Date of Patent: Feb. 5, 2013

(54) REINFORCED COMPOSITE RIM

(75) Inventors: Joshua Poertner, Carmel, IN (US); Michael Hall, Carmel, IN (US)

(73) Assignee: Compositech, Inc., Speedway, IN (US)

( * ) Notice: Subject to any disclaimer, the term of this patent is extended or adjusted under 35 U.S.C. 154(b) by 0 days.

(21) Appl. No.: 13/289,072

(22) Filed: Nov. 4, 2011

(65) Prior Publication Data
US 2012/0139326 A1 Jun. 7, 2012

Related U.S. Application Data

(62) Division of application No. 12/200,647, filed on Aug. 28, 2008, now abandoned.

(60) Provisional application No. 60/968,778, filed on Aug. 29, 2007.

(51) Int. Cl.
*B60B 5/02* (2006.01)
(52) U.S. Cl. ............................. 301/95.107; 301/95.102
(58) Field of Classification Search ............. 301/64.701, 301/64.702, 64.703, 95.102, 95.103, 95.104, 301/95.106, 95.107; 29/894.33, 894.35, 29/894.351; 156/93
See application file for complete search history.

(56) References Cited

U.S. PATENT DOCUMENTS

| | | | |
|---|---|---|---|
| 4,256,790 A * | 3/1981 | Lackman et al. | 428/73 |
| 6,106,646 A * | 8/2000 | Fairbanks | 156/73.3 |
| 7,105,071 B2 * | 9/2006 | Johnson et al. | 156/92 |
| 2005/0062337 A1 * | 3/2005 | Meggiolan et al. | 301/95.102 |
| 2007/0205654 A1 * | 9/2007 | Denk et al. | 301/95.102 |

* cited by examiner

*Primary Examiner* — Kip T Kotter
(74) *Attorney, Agent, or Firm* — Milan Milosevic; Lisa Serdynski; Steven Courtright

(57) ABSTRACT

A composite rim including a reinforcing assembly is provided. The composite rim includes a first sidewall portion, a second sidewall portion, a radially outer portion and a reinforcing assembly. The radially outer portion includes a radially outwardly-facing tire-engaging surface. The reinforcing assembly is disposed proximate the tire-engaging surface and includes a reinforcer and a containment member for containing the reinforcer. The reinforcer has an axis extending circumferentially about the composite rim and is configured to reinforce the composite rim in a direction generally perpendicular to the axis of the reinforcer.

2 Claims, 5 Drawing Sheets

REINFORCED COMPOSITE RIM

RELATED APPLICATION DATA

This application is a division of U.S. patent application Ser. No. 12/200,647 filed Aug. 28, 2008 now abandoned; which claims the benefit of U.S. Provisional Patent Application No. 60/968,778 filed on Aug. 29, 2007.

BACKGROUND OF THE INVENTION

The present invention relates to composite wheel rims, and more particularly, to a reinforced composite rim for use on human-powered vehicles, such as bicycles and wheelchairs.

Carbon fiber rims (also more broadly referred to herein as fiber resin plastic rims and composite rims) are strong and lightweight, making them popular for use in human-powered vehicle wheels. A carbon fiber composite rim is made up of sheets of material, similar to sheets of fabric. These sheets comprise carbon fibers that are cured within a bed of epoxy. The fibers within the bed of epoxy may be oriented in a desired direction For example, the carbon fibers may be oriented in a North-to-South direction, or alternatively, in an East-to-West direction. Although carbon fibers are very strong in their direction of orientation, they are less strong in directions perpendicular thereto.

One disadvantage of carbon fiber rims is that they are typically not well suited to absorb impacts in a radial direction, a type of impact that may occur when a bicycle wheel hits a pothole. In a hard pothole hit, a radially-outwardly-facing, tire-engaging surface of the wheel may strike an edge of the pothole, possibly causing a conventional rim to delaminate or develop cracks.

Looking to FIG. 1, a prior art wheel rim 170 is shown. The prior art rim 170 includes a first sidewall portion 172 and a second sidewall portion 174. The sidewall portions 172, 174 extend between a radially inner portion 176 of the rim and a radially outer portion 177 that includes a radially outwardly-facing, tire-engaging surface 178. The tire-engaging surface 178 is circumferential, generally forming the radially outermost portion of the rim. A plurality of spokes 189 extend radially between the radially inner portion 176 of the rim 170 and a hub (not shown) disposed at the axle of the wheel.

The configuration of the radially outwardly-facing surface of a bicycle wheel will vary depending on whether the wheel includes a "sew-up" rim or a "clincher" rim. In "sew-up" rims, a tire is glued to the tire-engaging surface 178. The rim in FIG. 1 has a "sew-up" configuration.

A clincher rim, on the other hand, includes a pair of generally upstanding members that include axially inwardly-extending beads configured to matingly engage the beads of a tire, the tire receiving a tube therein. The rim in FIG. 4 has a "clincher" configuration.

The rim 170 is a sew-up type rim. The tire-engaging surface 178 includes a first crown portion 180 and a second crown portion 182. Between the crown portions or "tows" 180, 182 is a valley 186.

When a tire and rim hit a pothole, the peaks of the crowns 180, 182 are the portions of the rim 170 most likely to strike the edge of a pothole and receive the full impact of the radial impact forces. For this reason, the two crown sections 180, 182 of the rim are the regions most susceptible to damage.

To reinforce the crown portions 180, 182, carbon fiber reinforcers or fiber bundles 184, 188 extend circumferentially about the rim. These fiber reinforcement bundles 184, 188 may comprise a plurality of carbon fibers, typically including about 48,000 very thin fibers.

The reinforcing bundles 184, 188 are sandwiched between layers of carbon fiber sheets of "fabric." Typically, the outer portion 177 of the carbon fiber rim 170, that includes the tire-engaging portion 178, may include as few as four or five sheets of carbon fiber material, in addition to the reinforcing bundles 184, 188, or as many as 20 sheets; the more sheets of carbon fiber used, the greater the strength of the rim, however, at the expense of weight and cost.

Although the reinforcing bundles 184, 188 may improve the strength of the crowns 180, 182, the bundles and the composite sheets may shift laterally relative to each other. This "shifting" may also be described as 'cleaving,' splitting or 'delaminating'. Although the carbon fiber reinforcer bundles 184, 188 help to reduce delamination, rims that include these reinforcer bundles 184, 188 are still subject to delamination.

SUMMARY OF THE INVENTION

The present invention provides a composite rim having a reinforcing assembly. The composite rim includes a first sidewall portion, a second sidewall portion, a radially outer portion and the reinforcing assembly. The radially outer portion includes a radially outwardly-facing tire-engaging surface. The reinforcing assembly is disposed proximate the tire-engaging surface. The reinforcing assembly includes a reinforcer and a containment member for containing the reinforcer. The reinforcer has an axis, the reinforcer and its axis extending circumferentially about the composite rim. The reinforcing assembly is configured to reinforce the composite rim in a direction generally perpendicular to the axis of the reinforcer.

In one embodiment of the present invention, the reinforcer includes a bundle of fibers and the containment member contains the bundle of fibers. The containment member may include a thread woven about the bundle. The composite rim further includes a plurality of fiber-reinforced sheets, the thread stitched through the fiber-reinforced sheets for mechanically coupling the fiber-reinforced sheets and the bundle. The composite rim may also include a plurality of fiber-reinforced cover sheets shaped to form a pocket for receiving the bundle. The cover sheets are stitched to enclose the bundle within the pocket. The fiber-reinforced cover sheets may be stitched to the fiber-reinforced sheets. In another embodiment of the present invention, the thread is woven to extend generally perpendicular to the axis of the reinforcer.

The containment member provides reinforcement and strength transverse to the plane of the composite sheet where strength is usually lacking due to the in-plane orientation of the fibers within the sheets. Most fiber-reinforced devices such as rims comprise a laminate formed of a plurality of sheets overlain on top of each other, much like the sheets of wood are stacked to form a plywood laminate.

The containment member or thread of the present invention places a strong member in direction generally perpendicular to the plane of the fiber-reinforced sheets to mechanically couple adjacent fiber-reinforced sheets. This mechanical bond formed by the thread, supplements the chemical bond between sheets formed by the glue or epoxy. The combination of the mechanical and chemical bonds helps to further inhibit delamination. The thread includes a woven material running in a direction generally perpendicular or out of plane to the fiber-reinforced sheets.

These and other features will be more fully understood from the following description of one or more embodiments of the invention, taken together with the accompanying drawings.

DETAILED DESCRIPTION OF DRAWINGS

DETAILED DESCRIPTION

Figure 1:
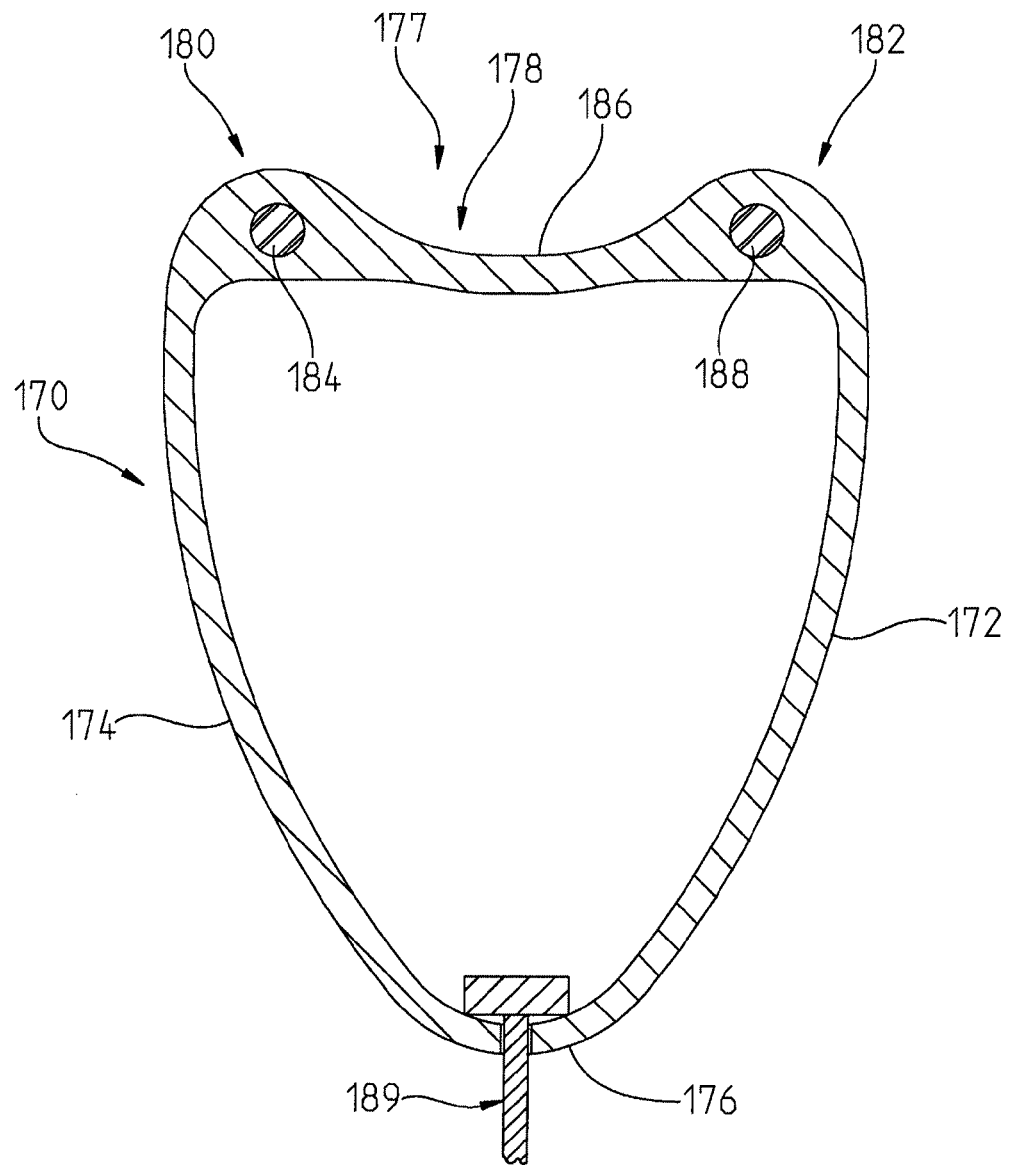
FIG. 1 is a cross-sectional schematic view of a prior art human-powered vehicle composite rim and spokes.
Figure 2:
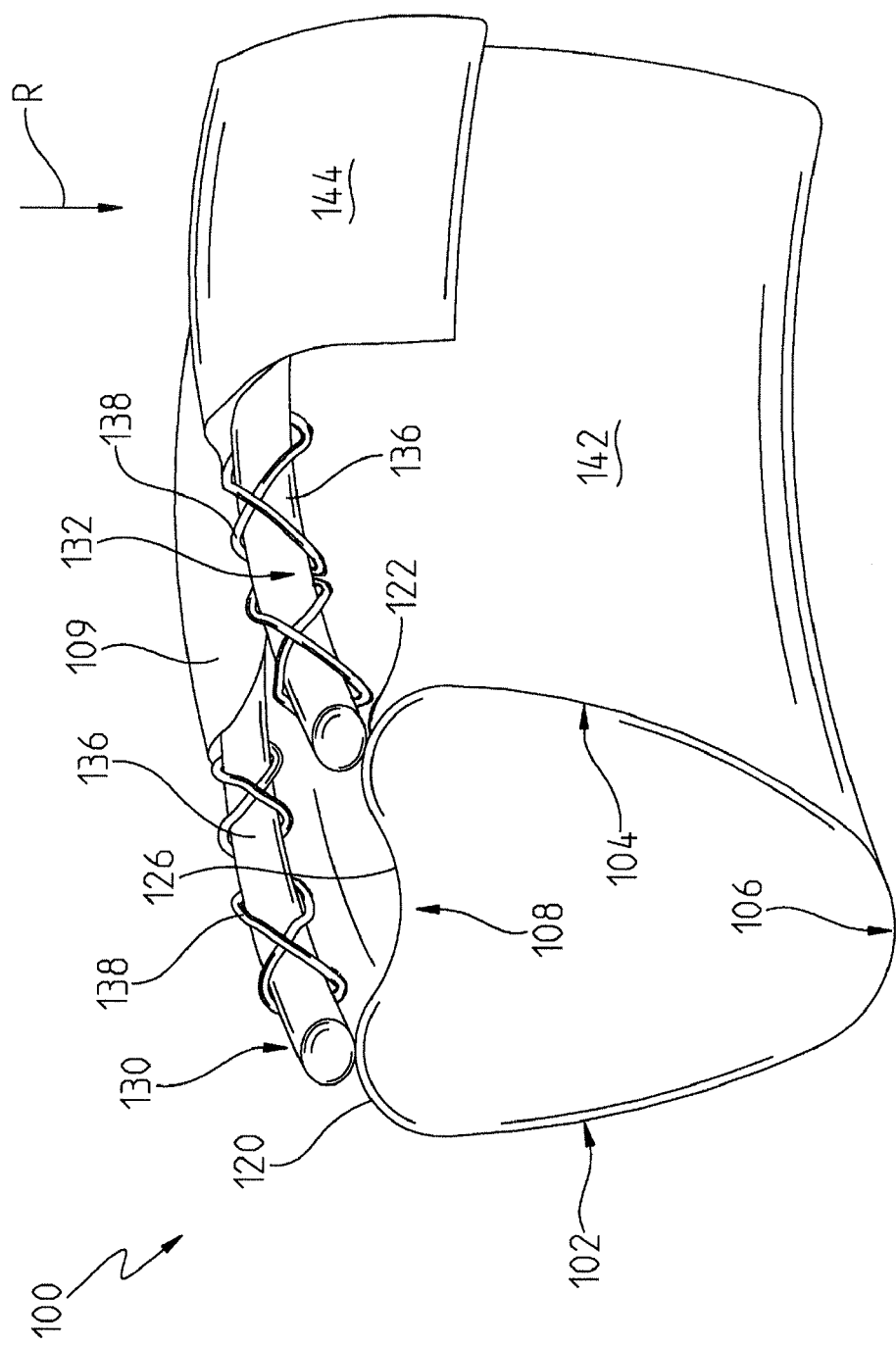
FIG. 2 is a perspective schematic view of a composite rim according to one embodiment of the present invention.

FIG. 2 illustrates a composite rim 100 according to one embodiment of the present invention. The composite rim 100 includes a first sidewall portion 102 and a second opposed sidewall portion 104. The sidewall portions 102, 104 extend between a radially inner portion 106 and a radially outer portion 108 that includes a radially outwardly-facing tire-engaging surface 109 configured to receive a tire. On a hoop-type wheel, spokes (see spoke 189 of FIG. 1) extend radially inwardly between the radially inner portion 106 and the hub (not shown) of the rim 100. By contrast, on a disc-type wheel (not shown), rim sidewall portions extend to about the center of the wheel, terminating in a hub-receiving central aperture that has a diameter of approximately one to two inches.

Figure 4:
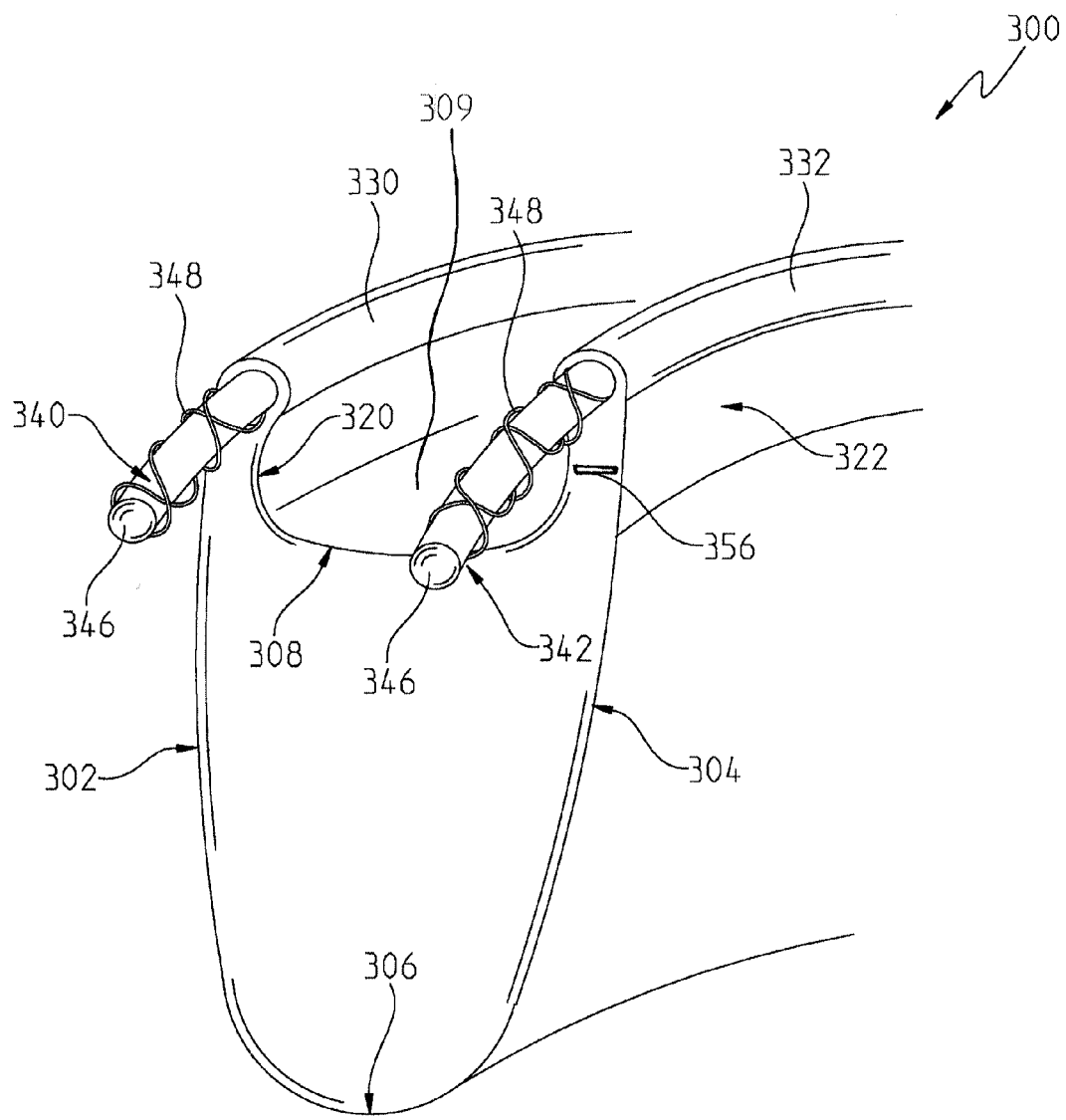
FIG. 4 is a perspective schematic view of another embodiment rim of the present invention.

The rim 100 shown in FIG. 2 is a "sew-up" type configured to receive "sew-up" tires, as opposed to a clincher-type rim designed for receiving tires with beads. An example of a "clincher" rim 300 is shown in FIG. 4. Although no disc-type wheels are shown in the drawings, the tire-engaging surface of a disc-type rim is similar to its non-disc counterpart. As such, the invention discussed herein is useable on both disc and non disc wheels without significant modification.

A sew-up tire lacks a radially inwardly-disposed rim-engaging bead. In order to attach a sew-up tire and tube to the rim, the tire and tube are glued to the radially outwardly-facing tire-engaging surface 109 of the rim 100. Usually, disc-type rims are sew-ups rather than clinchers.

The radially outer portion 108 includes a first crown portion 120 and a second crown portion 122. The first crown portion 120 is disposed adjacent the first sidewall portion 102 and the second crown portion 122 is disposed adjacent the second sidewall portion 104. A recessed valley portion 126 is disposed between the first and second crown portions 120, 122.

First and second reinforcers 130, 132 extend circumferentially along the first and second crown portions 120, 122, respectively. The reinforcers 130, 132 are disposed between a fiber-reinforced sheet 142 and a fiber-reinforced cover sheet 144 to form a sandwiched laminate. The reinforcers 130, 132 include a bundle of circumferentially-extending carbon fibers 136. This bundle of carbon fibers 136 may include approximately 48,000 individual carbon fibers bonded together, each bundle having a diameter of approximately 0.0050 inch, with each carbon fiber having a diameter of approximately less than 0.00001 inches. The fiber reinforced sheets may be made of carbon, glass, Kevlar® or similar fiber material.

As the reinforcers 130, 132 extend circumferentially about the rim 100 adjacent the tire-engaging surface 109, the reinforcers 130, 132 also each have an arcuate axis extending circumferentially about the rim. As such, the containment members, in this embodiment threads 138 that extend generally perpendicular to the axis of the reinforcers 130, 132, extend generally perpendicular to the tangent of arc formed by the arcuate axis of the particular reinforcer at the point where the particular thread 138 was positioned.

Threads 138 are woven to surround the carbon fiber bundles 136. The threads 138 may be made from various materials, for example, a para-aramid fiber material such as Kevlar® aramid fiber sold by Dupont®. The additional strength of Kevlar® helps to inhibit separation or "cleaving" of the carbon fibers 136 of the bundle during impact loading. Although the containment member is shown as thread, other items may be used such as clips, pins, staples, cables, etc.

Looking to FIG. 2, a radially-directed impact that exerts force against the rim 100 is generally indicated by an arrow R. By stitching the bundle together with thread 138, cleaving may be prevented thereby shielding the reinforcers 130, 132 from damage and inhibiting delamination of the fiber-reinforced sheets 142, 144 to increase the overall impact resistance of the rim 100.

Figure 3:
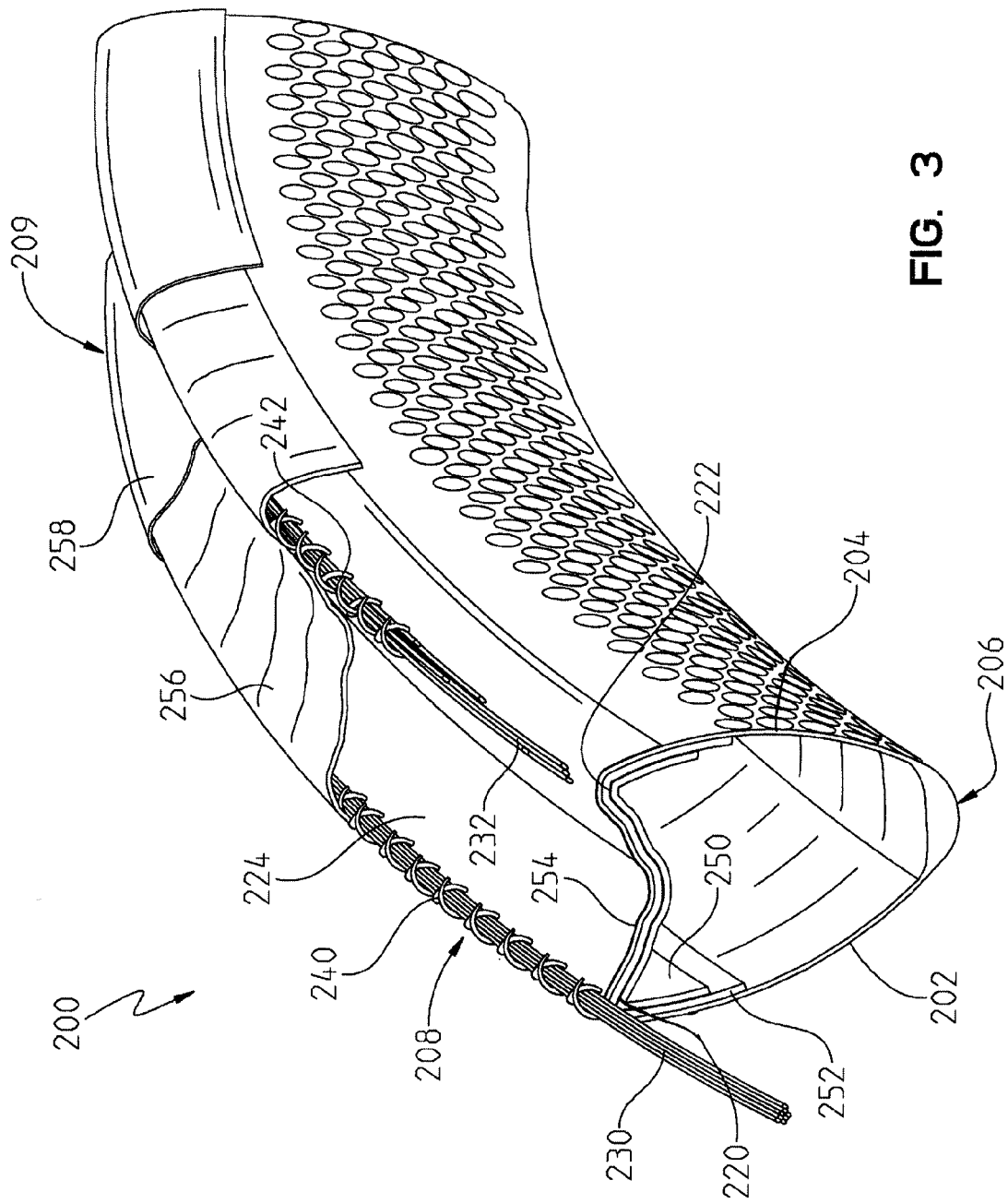
FIG. 3 is a perspective schematic view of another embodiment rim of the present invention, showing inter-laminar stitching.

FIG. 3 illustrates a rim 200 according to another embodiment of the present invention. The rim 200 includes a first sidewall portion 202 and a second sidewall portion 204. The first and second sidewall portions 202, 204 extend between a radially inner portion 206 and a radially outer portion 208. The radially outer portion 208 of the rim 200 includes a radially outwardly-facing tire-engaging surface 209. In this regard, the rim 200 is generally similar to the rim 100 shown in FIG. 2. Additionally, the rim 200 shown in FIG. 3 is a "sew-up" rim that includes the radially outwardly-facing tire-engaging surface 209, surface 209 including a first crown portion 220 and a second crown portion 222 with a valley portion 224 therebetween.

First and second reinforcers 230, 232 comprised of carbon fibers extend circumferentially along the crown portions 220, 222, respectively, so as to encircle the crown portions 220, 222, respectively. The reinforcers 230, 232 are similar to reinforcers 120, 122 shown in FIG. 2, also having arcuate circumferentially-extending axes.

Containment members or threads 240, 242 are also configured to contain the reinforcers 230, 232, respectively. Additionally, unlike the threads of FIG. 2, the threads 240, 242 of FIG. 3 are stitched to pierce one or more of the fiber-reinforced sheets for added reinforcement of the rim. Radially outwardly-facing tire-engaging portion 209 of the rim 200 include a plurality of fiber-reinforced sheets bonded together to form the laminate from which the rim 200 is constructed. The sheets include an inner sheet 250 that is overlain with a second sheet 252 that is overlain with a third sheet 254. It is understood that any number of sheets may be used to form the rim 200. In the embodiment of FIG. 3, The carbon fiber circumferentially-extending reinforcers 230, 232 are sandwiched between sheets 254, 256. The threads 240, 242 pierce the sheets 250, 252 254 to not only contain the reinforcers 230, 232 but also form a mechanical bond between the sheets 250, 252, 254. The carbon fiber reinforcers 230, 232 and threads 240, 242 are then overlain by another sheet 256, itself overlain by a fifth sheet 258.

Composite rims, such as rims 100, 200, are constructed of laminates formed by laying sheets of fiber-reinforced material on top of each other. Each fiber-reinforced sheet may be oriented in a desired direction (typically 0, 90, +45, −45 degrees) within the laminate to provide strength in the desired direction.

Looking to FIG. 4, a rim 300 is shown according to another embodiment of the present invention. The, rim 300 is a clincher-type rim, generally similar to sew-up rims 100 and 200 of FIGS. 2 and 3, except that the various components of the invention are adapted for receiving clincher-type tires as opposed to sew-ups.

The clincher rim 300 includes a first sidewall portion 302 and a second opposed sidewall portion 304, the first and second sidewall portions extending between a radially inner portion 306, and a radially outer portion 308. Radially outer portion 308 includes a tire-engaging portion 309.

The clincher rim 300 includes first and second radially and circumferentially-extending brake-engaging portions 320, 322 extending radially outwardly, as opposed to the crown-type appearance of the sew-up rims shown in FIGS. 2 and 3. Because of their columnar configuration, the brake-engaging portions 320, 322 may be especially susceptible to impact damage from radially directed forces.

Each of the brake-engaging portions 320, 322 terminate at their upper end in a relatively larger diameter bead portion 330, 332. The bead portions 330, 332 are configured to matingly receive a bead of a tire (not shown). Circumferentially-extending reinforcers 340, 342 extend through and along the first and second bead portions 330, 332, respectively. The reinforcers 340, 342 are generally similar to reinforcers 130, 132 of FIG. 2 as they may each include a bundle of carbon fibers 346 surrounded by a containment member or thread 348 formed of an aramid fiber stitching material. Additionally, the thread 348 may pierce through several sheets of the laminate, as shown in FIG. 3.

In FIG. 4, element 356 comprises a stitching material extending through the brake-engaging portions 320, 322. Stitching 356 has the benefit of providing the additional impact resistance discussed above as well as functioning as a brake wear indicator. The brake-engaging portions 320, 322 are engaged by caliper brakes (not shown) of a bicycle to slow the rotation of the rim. The frictional engagement between the caliper and the brake-engaging portions 320, 322 may wear down the contact surface of brake-engaging portions 320, 322 over time One may use a thread 356 having a color that is different than the color of the rim laminate to serve as a wear indicator. One or more laminate sheets are placed over the thread 356, so that when new, the stitching 356 will be hidden by the outer sheet of laminate. As the outer sacrificial laminate sheet is worn down under braking use, the thread 356 becomes visible.

Figure 5:
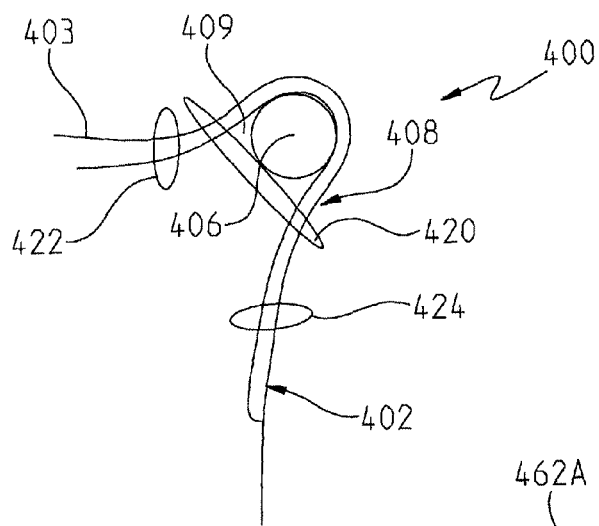
FIG. 5 is an enlarged schematic perspective view, representing a use of the containment member within the rim.
Figure 6A:
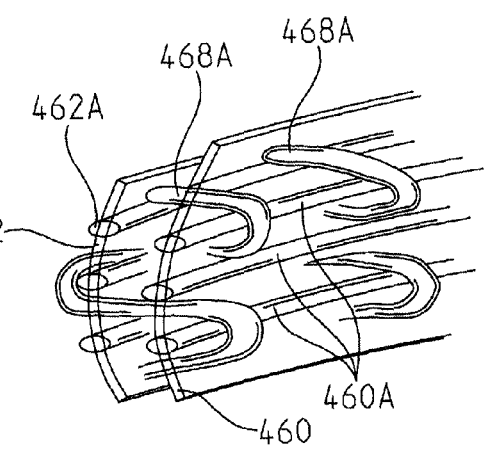
FIG. 6A is an enlarged view of FIG. 6 showing the containment member stitching together adjacent sheets of a fiber-reinforced material.
Figure 6:
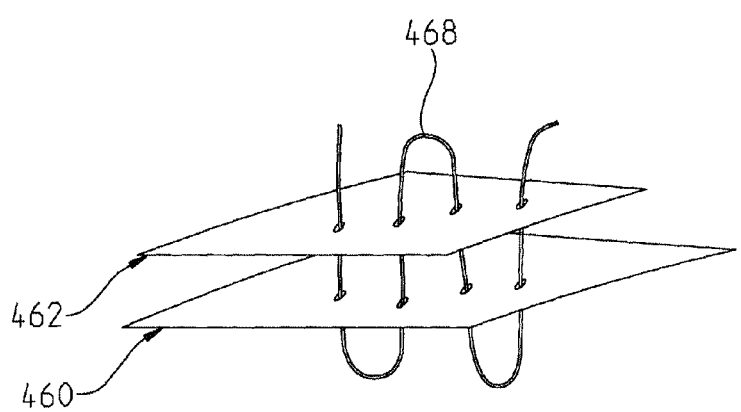
FIG. 6 is an enlarged schematic view showing the containment member stitching together adjacent sheets of a fiber-reinforced material.

FIGS. 5, 6 and 6A illustrate various stitching schemes. Looking first to FIG. 5, a segment of a rim 400 is shown having circumferentially-extending reinforcer 406 that is pocketed by a fiber-reinforced sheet 408 partially wrapped thereabout. The rim 400 also includes a sidewall portion 402 and a radially outwardly-facing tire-engaging portion 403.

Containment members, in this embodiment thread 420 is stitched through opposed portions of the sheet 408 to retain the reinforcer 406 in a pocket 409 formed by sheet 408. Trapping the reinforcer 406 in the pocket 409 limits its ability to shift under load thereby inhibiting fraying of the reinforcer and the sheet 408. Additionally, threads may be stitched at positions 422 and 424 of the sheet 408 to mechanically bond together adjacent fiber-reinforced sheets of the rim 400.

Looking to FIG. 6, a thread 468 is sewn or stitched between first fiber-reinforced sheet 460 and a second fiber-reinforced sheet 462 to provide a mechanical bond therebetween. The laminate includes first and second fiber-reinforced sheets 460, 462, a layer of glue or epoxy (not shown) disposed therebetween and the thread 468, stitched generally perpendicular to the plane of the sheets 460, 462. FIG. 6A shows a more detailed view of the laminate of FIG. 6, depicting the fibers 460A, 462A that form the laminate sheets 460, 462 and the weave of the thread 468A stitched generally perpendicular to the plane of the sheets to mechanically bond the sheets together.

Although the invention has been described with respect to one or more embodiments, it will be appreciated that variations and modifications exist that are limited in scope and spirit only by the claims appended thereto.

What is claimed:

1. A composite rim comprising:
 a first sidewall portion;
 a second sidewall portion;
 a radially outer portion that includes a radially outwardly-facing tire-engaging surface and one of first and second crown portions and first and second bead portions;
 a reinforcing assembly disposed at one of the first and second crown portions and the first and second bead portions; and
 a plurality of fiber-reinforced sheets sandwiching the reinforcing assembly, the reinforcing assembly including:
  a reinforcer having an axis extending circumferentially about the composite rim, the reinforcer comprising a bundle of fibers, and
  a containment member for containing the bundle of fibers of the reinforcer, the containment member including a thread woven about the bundle of fibers of the reinforcer,
  the reinforcing assembly configured to reinforce the composite rim in a direction generally perpendicular to the axis of the reinforcer, wherein the thread is stitched through the fiber-reinforced sheets for mechanically coupling the fiber-reinforced sheets and the bundle.

2. The composite rim of claim 1, wherein the plurality of fiber-reinforced sheets are shaped to form a pocket for receiving the bundle, the fiber-reinforced sheets stitched to enclose the bundle within the pocket.

* * * * *